United States Patent
Buck et al.

[11] Patent Number: 6,001,314
[45] Date of Patent: Dec. 14, 1999

[54] CATALYTIC CONVERTER HOUSING WITH DEEP DRAWN SHELLS

[75] Inventors: Roger Eugene Buck, Fenton; Dana Michael Serrels, Davison; Stephen Joe Myers, Owosso, all of Mich.

[73] Assignee: General Motors Corporation, Detroit, Mich.

[21] Appl. No.: 08/929,045

[22] Filed: Sep. 15, 1997

[51] Int. Cl.[6] .................................................. B01D 5/34
[52] U.S. Cl. .................................... 422/177; 422/171
[58] Field of Search ................................. 422/177, 180, 422/179, 211, 221, 222, 171, 174; 55/DIG. 30; 60/299, 300

[56] References Cited

U.S. PATENT DOCUMENTS 5,118,476  6/1992  Dryer et al. ........................... 422/179

OTHER PUBLICATIONS

Metals Handbook, 8th Edition, vol. 4, Forming, American Society for Metals, Metals Park, Ohio 44073, pp. 162–200.

Primary Examiner—Hien Tran
Attorney, Agent, or Firm—Vincent A. Cichosz

[57] ABSTRACT

A housing for a catalytic converter for an automotive vehicle engine exhaust system is formed of two deep drawn shells having open inner ends welded together in generally abutting relation. Modified conical outer ends taper to reduced size openings for connection to associated exhaust system pipes. To permit deep drawing, the outer ends as seen in longitudinal cross section are formed with curved surfaces including an intermediate curvature replacing a conventional conical shape and defined by radii of a value between 0.5 and 0.8 times the inner diameter of the tubular body portions of the respective shells which enclose a catalytic element. Connecting radii are preferably not greater than 0.1 times the tubular portion inner diameter. Various alternative forms of welded inner end joints are disclosed.

14 Claims, 4 Drawing Sheets

6,001,314

CATALYTIC CONVERTER HOUSING WITH DEEP DRAWN SHELLS

TECHNICAL FIELD

This invention relates to housings for catalytic converters and to deep drawn shells for such housings.

BACKGROUND

It is known in the art relating to catalytic converters to provide a housing of the clamshell type formed by two half shells joined along longitudinally extending flanges to form an enclosure for a catalytic element or substrate. In converters having frangible catalyst coated monolith elements, the housing may have a cylindrical interior of, for example, circular or oval cross section, depending on the shape of the enclosed element. A supporting mat may be provided to allow for expansion while holding the catalyst element firmly in place. The clamshell housings are easy to assemble but have a longitudinal seam along both sides which must be welded or otherwise sealed. Alternatively, a tubular or cylindrical body may be provided with separately formed end pieces that are welded on the ends of the tubular body. The end pieces include generally conical walls which connect the tubular portion enclosing the catalytic element with a smaller end opening for connection with an exhaust system pipe.

SUMMARY OF THE INVENTION

The present invention provides a generally cylindrical housing (e.g. of round, oval or other suitable cross section) which is made from two deep drawn shells of stainless steel material and of generally cup-like configuration. The shells have generally tubular bodies with one fully open end and an opposite end tapering from the main cylindrical portion to a reduced diameter connecting portion adapted for connection to an exhaust system pipe.

In order to permit forming of the shells by known deep drawing processes, the ends are modified from the generally conical end configurations used in prior separately formed end pieces. Thus, a graduated reduction in internal diameter is obtained by forming the walls in the end with a combination of curvatures. The various curvatures include an intermediate curvature forming a segment of a sphere or a modified (bulged) cone, the segment having a lateral major dimension or diameter and a lateral minor dimension or diameter. An outer curvature tangentially connects the major diameter with the tubular portion. An inner curvature tangentially connects the minor diameter with an essentially radial portion of the end. The radial portion connects with a reverse curvature that extends to an essentially longitudinal snout or end, defining the opening for connecting with a tubular pipe in a vehicle engine exhaust system.

The intermediate curvature forms a major portion of the end wall and has a relatively large radius to approximate a nozzle of conical shape. The other curvatures are much smaller, serving to smoothly connect the intermediate curvature with the tubular portion at one end and the pipe connecting opening at the other.

The open ends of the shells are joined in generally abutting relation by any suitable manner, such as by welding in accordance with proposed optional joint configurations. Each tapered end includes a curved wall formed in part as a segment of a sphere or modified cone with prescribed curvature to allow the shell to be made by a deep drawing process.

These and other features and advantages of the invention will be more fully understood from the following description of certain specific embodiments of the invention taken together with the accompanying drawings.

BRIEF DRAWING DESCRIPTION

DETAILED DESCRIPTION OF THE DRAWINGS

Figure 1:
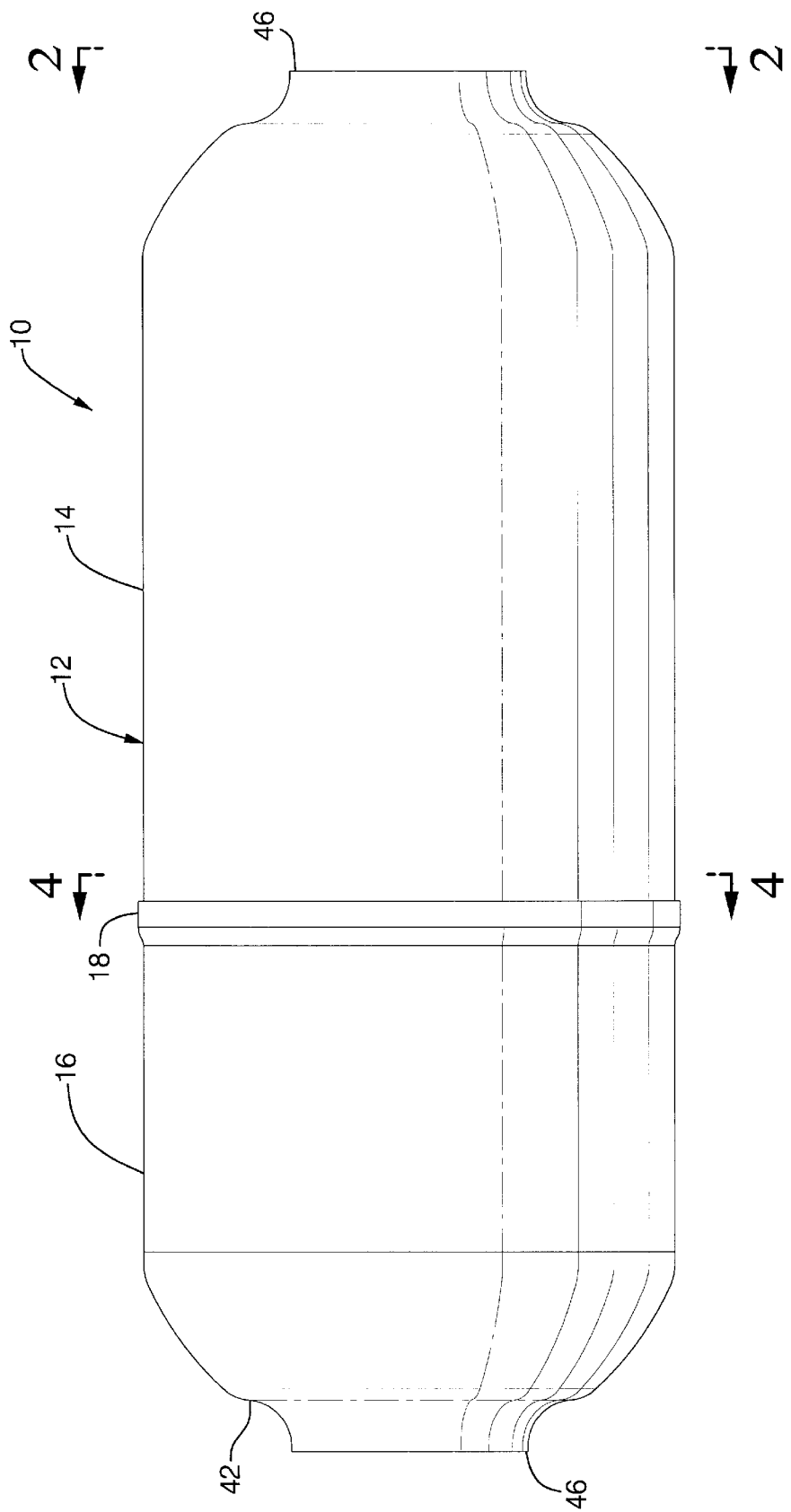
FIG. 1 is a side view of a catalytic converter having a tubular housing in accordance with the invention.
Figure 2:
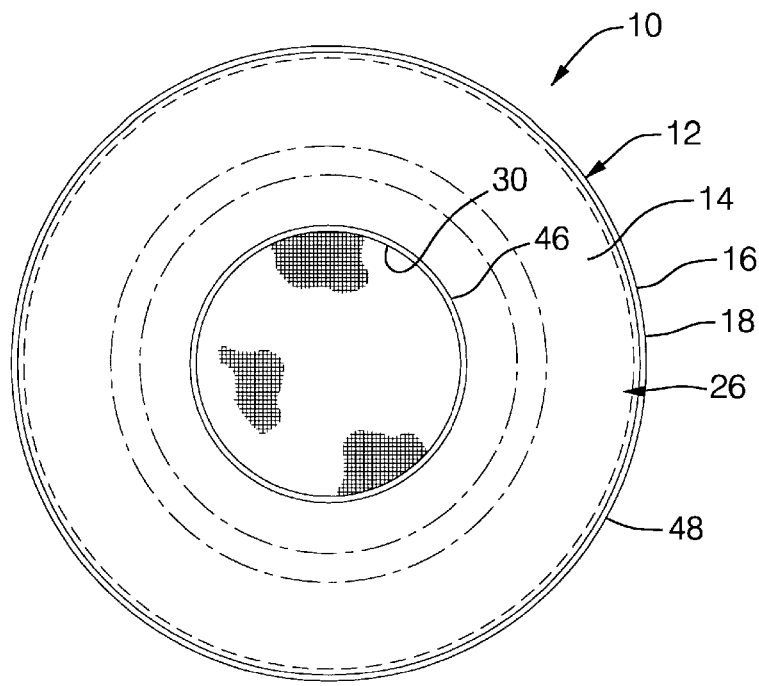
FIG. 2 is an end view of the converter of FIG. 1.
Figure 4:
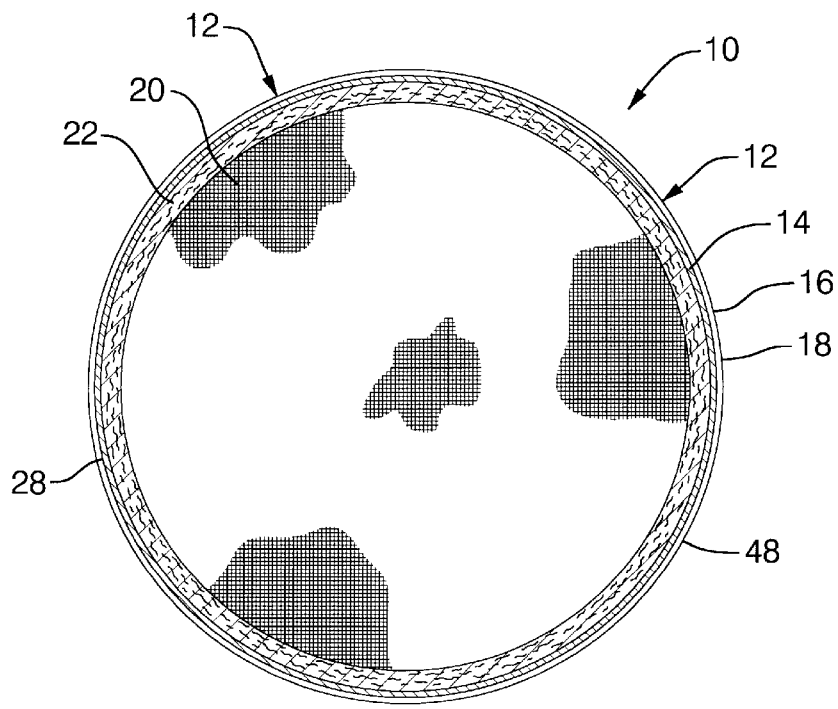
FIG. 4 is a transverse cross-sectional view from the plane of the line 4—4 of FIG. 1.
Figure 3:
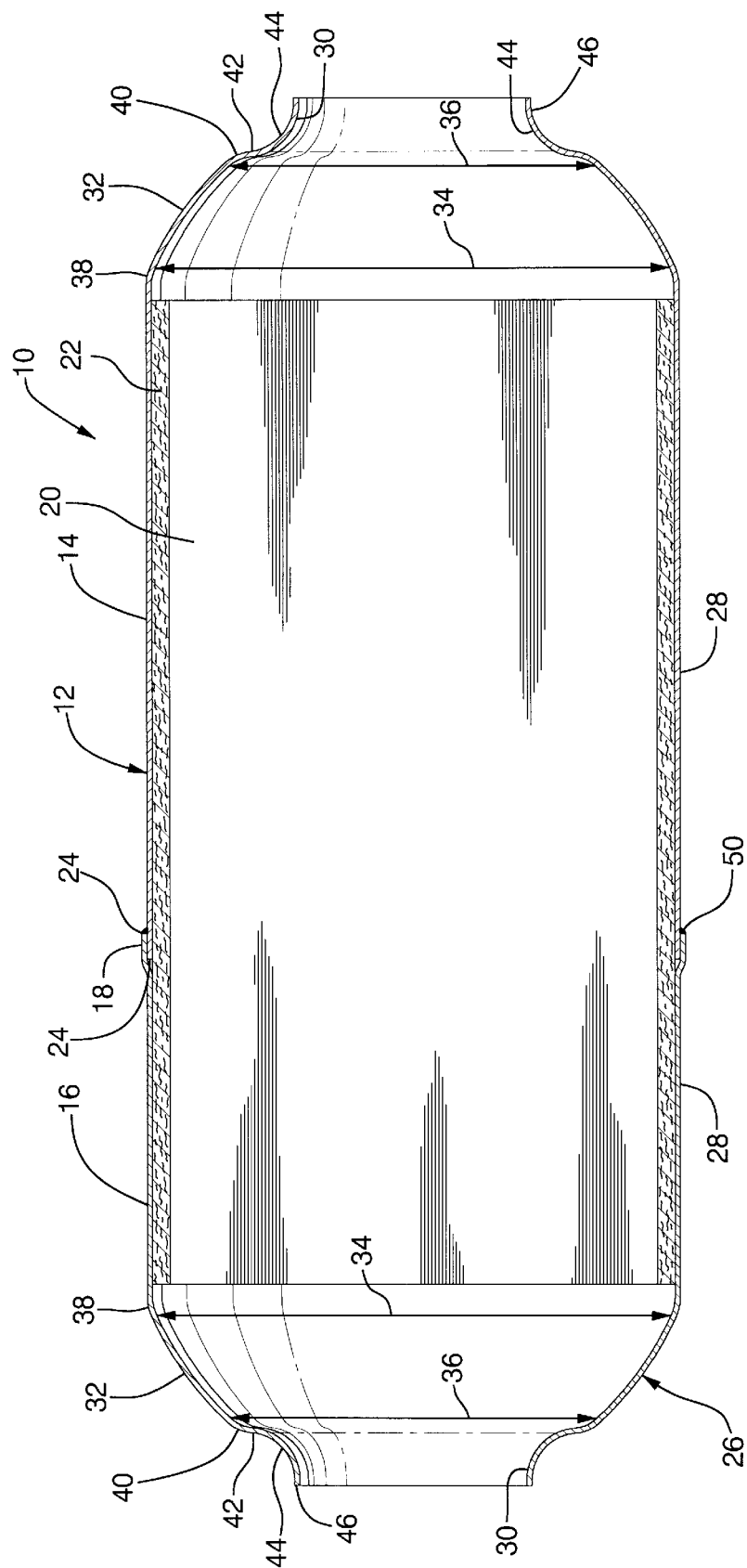
FIG. 3 is a longitudinal cross-sectional view from the plane of the central axis of the converter indicated by the line 3—3 of FIG. 1.

Referring now to the drawings in detail, numeral 10 generally indicates a catalytic converter having a housing 12, preferably made of a stainless steel material. Housing 12 is formed by a pair of deep drawn stainless steel shells 14, 16 which are welded together at a transverse or lateral peripheral joint 18. The joined shells may enclose a conventional catalytic monolith element 20 surrounded laterally by a suitable protecting and retaining mat 22.

Each of the shells 14, 16 is formed as a generally tubular body having a fully open end 24 and a reduced opening end 26 connected together by a tubular portion 28 of essentially constant diameter (or internal lateral dimension). The shells 14, 16 are of circular cross section although other suitable configurations, such as oval, could be substituted if desired.

In order to permit forming of the shells by known deep drawing processes, the ends 26 are modified from the generally conical end configurations used in prior separately formed end pieces. Thus, in the deep drawn shells 14, 16, a graduated reduction in internal diameter from the constant diameter tubular portion 28 to a smaller diameter opening 30 is obtained by forming the walls in the end 26 with a combination of curvatures.

The various curvatures forming the combination referred to include an intermediate curvature 32 forming a segment of a sphere or a modified (bulged) cone, the segment having a lateral major dimension or diameter 34 and a lateral minor dimension or diameter 36. An outer curvature 38 tangentially connects the major diameter 34 with the tubular portion 28. An inner curvature 40 tangentially connects the minor diameter 36 with an essentially radial portion 42 of the end 26. The radial portion 42 connects with a reverse curvature 44 that extends to an essentially longitudinal snout or end 46 defining the opening 30 for connecting with a tubular pipe, not shown, in a vehicle engine exhaust system.

The intermediate curvature 32 forms a major portion of the end 26 and has a relatively large radius to approximate a nozzle of conical shape. The other curvatures are much sharper, serving to smoothly connect the intermediate curvature with the tubular portion 28 at one end and the pipe connecting opening 30 at the other. In the embodiment of FIGS. 1–4, the radii of the connecting curvatures 38, 40, 44 are between 7 and 10 times smaller than the radius of the intermediate curvature 32.

In accordance with a preferred example of the invention, the intermediate curvature 32 is defined by one or more radii having a value between 0.5 and 0.8 times the internal diameter of the tubular portion. The inner and outer curvatures and the reverse curvature are defined by radii not greater than 0.1 times the internal diameter (ID) of the tubular portion.

In a particular embodiment shown in FIGS. 1–4, the intermediate curvature 32 is about 0.62 times the ID of the tubular portion. The outer and reverse curvatures are about 0.085 times and the inner curvature is about 0.067 times the ID of the tubular portion. These connecting curvatures may be adjusted as needed in a particular case. The value of the intermediate curvature is more critical, as a minimum curvature is required to promote metal flow in the deep drawing process, but a curvature approximating a conical configuration is preferred for maintaining efficient exhaust gas flow.

The form of the welded joint 18 which holds the assembled shells 14, 16 in abutting relation may be varied as desired to suit the needs of a particular construction or application. One form of a joint for the purpose is applied in the embodiment of FIGS. 1–4. There, the (in this case shorter) shell 16 is provided at its open end 24 with a radially enlarged longitudinal annular lip 48 which fits closely over the abutting open end 24 of the associated (longer) shell 14. A weld bead 50 is then formed between the end of the lip 48 and the adjacent tubular portion 28 of the other shell 14 to seal the joint and maintain the shells in permanent assembly.

Figure 5:
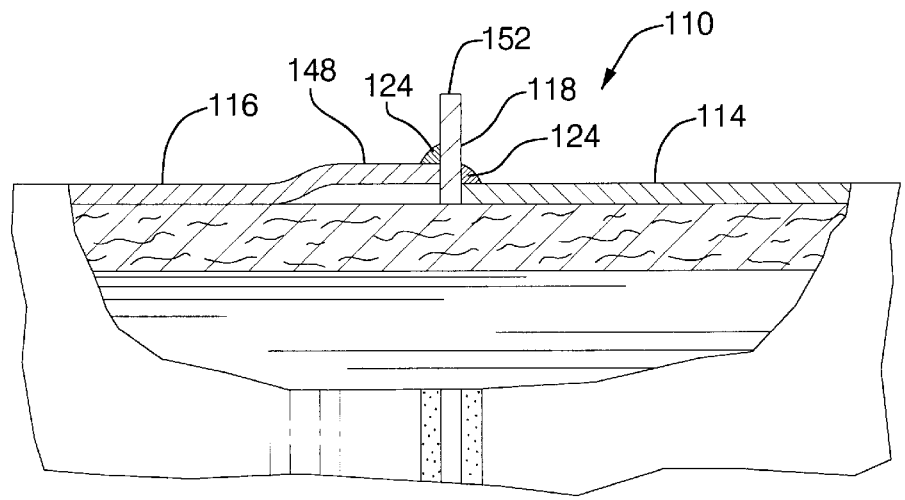
FIG. 5 is a fragmentary cross-sectional view showing a first alternative welded joint for the shells.

FIG. 5 shows a housing 110 having a first alternative form of joint 118 for shells 114, 116. A radial annular ring 152 is provided to which the open ends 124 of the shells are flash butt welded. While shell 116 is shown with a lip 148 in place, this lip may be omitted with this form of welded joint 118.

Figure 6:
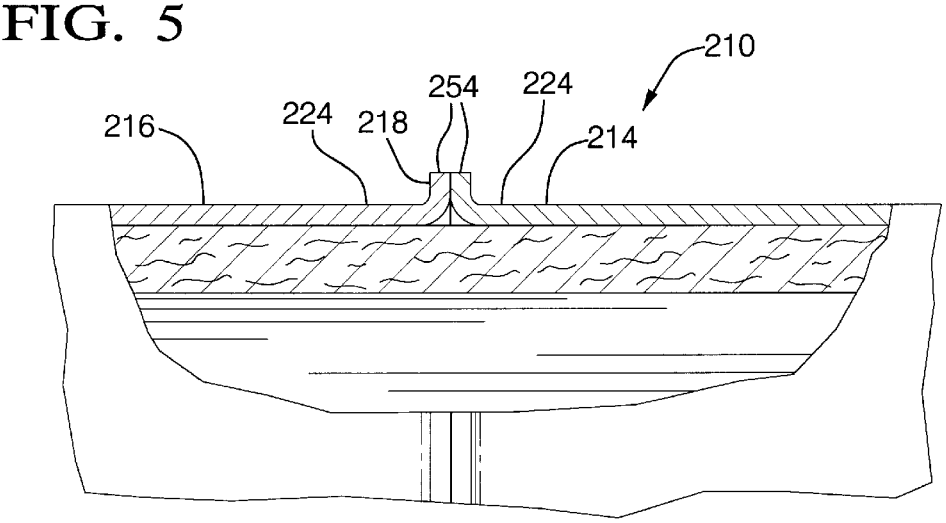
FIG. 6 is a view similar to FIG. 5 but showing a second alternative welded joint.

FIG. 6 shows a housing 210 having a second alternative form of joint 218 for shells 214, 216. Here, the open ends 224 of shells 214, 216 are formed with flared edges forming flanges 254. The flanges 254 are then TIG welded together to complete the assembly.

Figure 7:
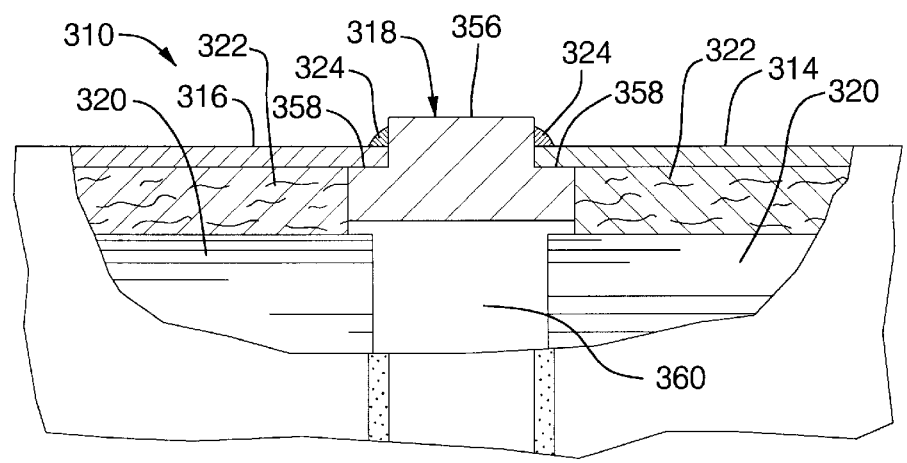
FIG. 7 is a view similar to FIG. 5 but showing a third alternative welded joint.

FIG. 7 shows a housing 310 having a third alternative form of joint 318 for shells 314, 316. There, a longitudinally extended intermediate annular ring 356 is provided. The ring 356 has annular recesses 358 at its outer edges in which the open ends 324 of the shells 314, 316 are received for flash butt welding to the ring 356. An extended inner portion of the ring 356 lies under the ends 324 of the shells 314, 316 and between inner ends of separate mats 322, supporting spaced monolithic catalyst elements 320. A space 360 between the elements 320 and mats 322 provides room for the installation of an oxygen sensor or other device, not shown, for sensing the operating condition of the converter between the elements 320.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A deep drawn shell for a catalytic converter, said shell comprising;
   a generally tubular body having a fully open end and a reduced opening end connected by a tubular portion;
   said tubular portion being of essentially constant internal lateral dimensions;
   said open end having internal lateral dimensions not substantially less than those of the tubular portion;
   said reduced opening end having a reduction in internal lateral dimensions from the tubular portion to a smaller connecting portion, said reduction including;
   an intermediate curvature forming a segment of a modified cone, the segment having a lateral major dimension and a lateral minor dimension;
   an outer curvature tangentially connecting the major dimension of the segment with the tubular portion; and
   an inner curvature tangentially connecting the minor dimension of the segment with an essentially radial portion;
   said radial portion connected by a reverse curvature with a tubular pipe connecting portion;
   wherein said intermediate curvature is defined by radii between 0.5 and 0.8 times said internal lateral dimensions of the tubular portion and said inner and outer curvatures and said reverse curvature are defined by radii not greater than 0.1 times said internal lateral dimensions of the tubular portion.

2. A deep drawn shell as in claim 1 wherein said tubular portion is a circular cylinder, said intermediate curvature is a segment of a sphere defined by a constant radius and said inner, outer and reverse curvatures are each defined by a constant radius.

3. A deep drawn shell as in claim 2 wherein said constant radius of the intermediate curvature is about 0.6 times the internal diameter of said tubular portion and said constant radii of the inner, outer and reverse curvatures are not greater than about 0.09 times the internal diameter of the tubular portion.

4. A deep drawn shell as in claim 1 wherein said shell is formed of a stainless steel alloy material.

5. A housing for a catalytic converter comprising two shells as defined in claim 1, the fully open ends of the shells welded in generally abutting relation.

6. A housing as in claim 5 wherein the open end of one of the shells has an enlarged portion surrounding the open end of the other shell.

7. A housing as in claim 5 wherein the open ends of the shells are each connected to a radial flange, the flanges then being TIG welded together.

8. A housing as in claim 5 wherein the open ends of the shells are welded to an intermediate ring.

9. A housing as in claim 8 wherein said ring is a flat radial ring to which the shell ends are flash butt welded.

10. A housing as in claim 8 wherein said ring is an axially elongated spacer ring having opposite annular end recesses into which said open ends of the shells are welded.

11. A housing as in claim 10 wherein said ring has a length sufficient to support a sensor for sensing internal conditions in an operating converter.

12. A deep drawn shell for a catalytic converter, said shell comprising:
   a generally tubular body having a fully open end and a reduced opening end connected by a tubular portion;
   said tubular portion being of essentially constant internal lateral dimensions;

said open end having internal lateral dimensions not substantially less than those of the tubular portion;

said reduced opening end having a reduction in internal lateral dimensions from the tubular portion to a smaller connecting portion, said reduction including;

an intermediate curvature forming a segment of a modified cone, the segment having a lateral major dimension and a lateral minor dimension;

an outer curvature tangentially connecting the major dimension of the segment with the tubular portion; and an inner curvature tangentially connecting the minor dimension of the segment with an essentially radial portion;

said radial portion connected by a reverse curvature with a tubular pipe connecting portion;

wherein said intermediate curvature forms a major portion of said reduced opening end and said outer and inner curvatures are both shorter and sharper than said intermediate curvature.

13. A deep drawn shell as in claim 12 wherein said intermediate curvature has a radius between 7 and 10 times greater than those of the outer, inner and reverse curvatures.

14. A housing for a catalytic converter comprising two shells as defined in claim 12, the fully open ends of the shells welded in generally abutting relation.

* * * * *